(12) United States Patent
Hsu

(10) Patent No.: US 12,454,150 B2
(45) Date of Patent: Oct. 28, 2025

(54) BICYCLE REAR HUB DRIVE MECHANISM

(71) Applicant: Jose Fernando Hsu, Surrey (CA)

(72) Inventor: Jose Fernando Hsu, Surrey (CA)

(\*) Notice: Subject to any disclaimer, the term of this patent is extended or adjusted under 35 U.S.C. 154(b) by 389 days.

(21) Appl. No.: 18/045,176

(22) Filed: Oct. 10, 2022

(65) Prior Publication Data

US 2023/0122994 A1    Apr. 20, 2023

(30) Foreign Application Priority Data

Oct. 11, 2021   (CA) ................................ CA 3133848

(51) Int. Cl.
| | | |
|---|---|---|
| *B60B 27/04* | (2006.01) | |
| *B60B 27/02* | (2006.01) | |
| *F16D 41/20* | (2006.01) | |
| *F16D 41/24* | (2006.01) | |
| *F16D 41/36* | (2006.01) | |

(52) U.S. Cl.
CPC .......... *B60B 27/047* (2013.01); *B60B 27/023* (2013.01); *F16D 41/24* (2013.01); *F16D 41/36* (2013.01)

(58) Field of Classification Search
CPC .......... F16D 41/22; F16D 41/24; F16D 41/26; F16D 41/36; F16D 11/04; F16D 11/06; F16D 11/16; F16D 41/206; B60B 27/023
See application file for complete search history.

(56) References Cited

U.S. PATENT DOCUMENTS

| | | | | |
|---|---|---|---|---|
| 5,964,332 A | * | 10/1999 | King .................... | B60B 27/023 192/64 |
| 6,123,179 A | * | 9/2000 | Chen .................... | F16D 41/36 192/64 |
| 6,588,564 B1 | * | 7/2003 | Jager .................... | B60B 27/047 192/64 |
| 9,199,509 B2 | * | 12/2015 | Koshiyama ........... | B60B 27/047 |
| 10,406,856 B2 | * | 9/2019 | Chen .................... | B60B 27/047 |
| 10,780,737 B2 | * | 9/2020 | Nakajima ............. | B60B 27/023 |

\* cited by examiner

*Primary Examiner* — Ernesto A Suarez
*Assistant Examiner* — Lillian T Nguyen

(57) ABSTRACT

A mechanism for bicycle wheel, that transfers drive motion from the drive-train to the wheel, while allowing non ratcheting freewheeling when coasting.
The mechanism uses of a pair of face gears, with the first gear fixed within the hubshell, while the second gear is rotary fixed but allowed to move axially within the freehub. The second gear is attached to prismatic sliding joints with springs, coiled over a shaft fixed to the hubshell.
Rotating the freehub in the forward direction by the drive-train, rotates the second gear, sliding on the prismatic joints to axially dispose it towards the first gear until they couple and transfer drive. When the freehub rotates in the opposite direction relative to the hubshell, the second gear moves away from the first gear, transferring an unwinding motion to the coiled springs that start to slip on the rotating shaft, allowing freewheeling.

2 Claims, 6 Drawing Sheets

BICYCLE REAR HUB DRIVE MECHANISM

FIELD OF INVENTION

This invention relates to bicycle hubs in general. More specifically, this invention allows the transfer of drive torque from the drive-train, while allowing freewheeling without ratcheting.

Introduction/Background of the Invention Every bicycle freewheel mechanism, hosted within its rear wheel hub, has one common goal: where the bicycle user can disengage the driven wheel from the drive-train effortlessly when they stop pedaling, or when their pedaling cadence does not drive the driving wheel; allowing the bicycle user to freewheel. Freewheeling is necessary to prevent the wheel from back driving the drive-train and rotating the bicycle pedals.

The pursue for new inventions in freewheel mechanisms is driven by the demand to improve some of the aspects that defines its qualities; mainly to increase its longevity and reliability by decreasing wear, increasing the torque load against component failure, reducing the weight of the mechanism, speeding the pick-up engagement of the mechanism, and lowering the friction generated by the mechanism when freewheeling.

There are many different freewheel designs, and they can mostly be classified into two main categories based on one key perceptible aspect.

Ratcheting mechanisms such as described in these inventions: US2019219109A1, US9676233B1, US6588564, US7562755B2, US5964332.

And friction based mechanisms as described in these inventions: US2017291448A1, US9102197B2, US10464371B2.

Ratcheting mechanisms are based on dog clutches that couple the drive-train to the driven wheel with a mechanical locking advantage by interference or clearance fit of its components. Surface friction mechanisms consist of a trapped bearing or sprag arrangement, which wedges them against a smooth radial surface, creating sufficient friction to transmit driving torque.

One of the most distinctive differences between the ratcheting and surface friction mechanisms, is the audible and repetitive percussive clattering in ratcheting mechanisms, and the lack thereof in surface friction based mechanisms.

Both types of mechanisms have their own drawbacks which the proposed invention will address: The major drawback in ratcheting based mechanisms consist of wear of the coupling components during freewheeling. As the mechanism ratchets during freewheeling, there is constant impact and sliding friction to the same surfaces used to transmit driving torque from the drive-train to the wheel. Eventually the wear will lead the mechanism to start slipping during high driving torque demand. The effects of wear are worsen on ratcheting face gear mechanisms, such as the one described in this invention: U.S. Pat. No. 6,588,564. To archive the highest torque transfer rating to weight ratio of all freewheel mechanisms, it accomplishes so by having all of its face gear teeth transfer driving torque at once, the friction and wear from ratcheting now applies to all the face gear teeth at any given freewheeling instance.

Friction based mechanisms ability to transfer driving torque depends on the surface fiction between its components, by using high radial forces to generate friction and transmit the rotation of the drive-train to the driven wheel without slipping. These mechanisms are dependent of very close manufacturing tolerances and robust construction to contain these forces and to limit its deflection and deformation. The robust construction requirement makes these mechanisms much heavier than ratcheting mechanisms. Introduction of any contaminants would greatly compromise this sensitive mechanism. Any geometrical deformation from wear will likely cause the mechanism further slip during lower driving torque demand.

The proposed invention merges some of the qualities of both to address their respective drawbacks.

SUMMARY OF THE INVENTION

The proposed invention integrates both mechanism concepts by dividing the mechanism action so that the torque transmitting, load bearing components of the mechanism are not the same components subject to friction and wear during freewheeling. It takes a pair of the existing and most durable torque transmitting face gears, and prevents them from ratcheting during freewheeling, by retracting one away relative to the other. This is accomplished by having a part of the mechanism with the sole purpose of coupling and decoupling of the face gears; which switch the whole mechanism between driving and freewheeling. It will be refereed as the initiator portion of the mechanism.

The initiator portion of the mechanism acts as a one way clutch on its own, with a very light override load rating, and not intended to transmit drive torque. This allows very low friction during freewheeling of the entire mechanism. The preferred embodiment consists of a plurality of wound springs, or coil members, coiled over a shaft or cylinder member. The shaft is fixed axially and rotary to the hubshell portion connected to the wheel. The springs are also attached, at one end, to a face gear hosted within the freehub to form prismatic sliding joints. These joints convert the rotational motion of the face gear to an axial movement towards or away from the other face gear axially and rotary fixed within the hubshell, depending on the direction of rotation. The coiled springs have a static friction against rotation relative to the shaft and act as the support for the prismatic joint action. In the instance of displacement of the face gears axially apart, the rotation motion, after the end of the prismatic joint travel by the moving face gear, is transferred to the coiling of the springs to partially unwind them, so that the friction against rotation of the springs to the shaft is overcome; with the shaft rotating relative to the coiled springs.

In the instance of displacement of the face gears together, the rotation motion converted into axial displacement of the axially moving face gear, by the prismatic sliding joints, couples the face gears together to continue transferring the rotation motion to the hubshell. Any torque generated by the components comprising of the prismatic sliding joints is transferred to the coiling of the springs on the shaft; which in this direction, induces a wrapping force, increasing the friction forces against rotation of the shaft relative to the coiled springs, so that its not overcome.

The coupling of the face gears is the driving torque bearing portion of the mechanism.

The sliding of the springs on the shaft allow freewheeling, and also keep the moving face gear away from the fixed face gear, continuously drawn towards the springs.

To further understand the proposed invention, the following detailed description of a preferred embodiment in conjunction with accompanying drawings will make the invention more apparent.

BRIEF DESCRIPTION OF THE DRAWINGS

Referring to the figures attached to this document which form a part of this original disclosure:

FIG. 3b shows another perspective of the exploded view found in FIG. 3a.

DETAILED DESCRIPTION OF PREFERRED EMBODIMENT

The selected embodiment of the invention described with the drawings, is provided for illustration only and is not meant to limit the invention as defined by the claims; where it can be susceptible to various changes and modifications without departing from the spirit of the invention.

Figure 1:
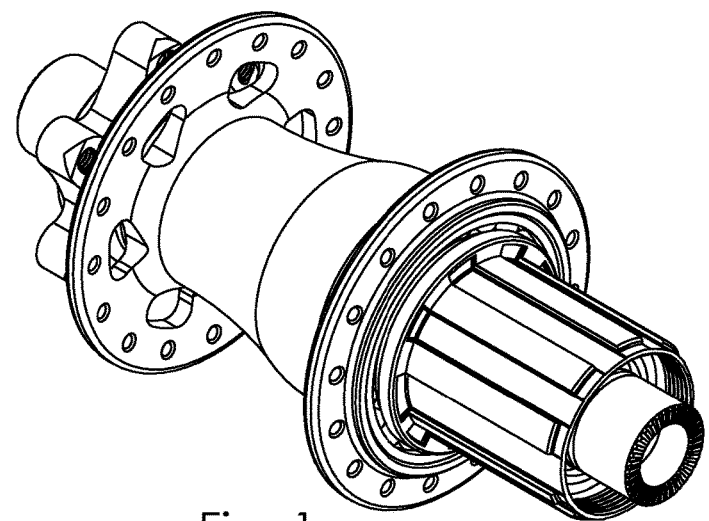
FIG. 1 shows a perspective view of an embodiment of a bicycle rear hub, in which the preferred embodiment of the disclosed invention is hosted within

Referring first to FIG. 1, A typical embodiment of a bicycle rear hub is illustrated. The hub is attached to a rim by spokes, and with a tire mounted on the rim, they form the basic elements for a functional rear bicycle wheel that attaches to a bicycle frame.

Figure 2:
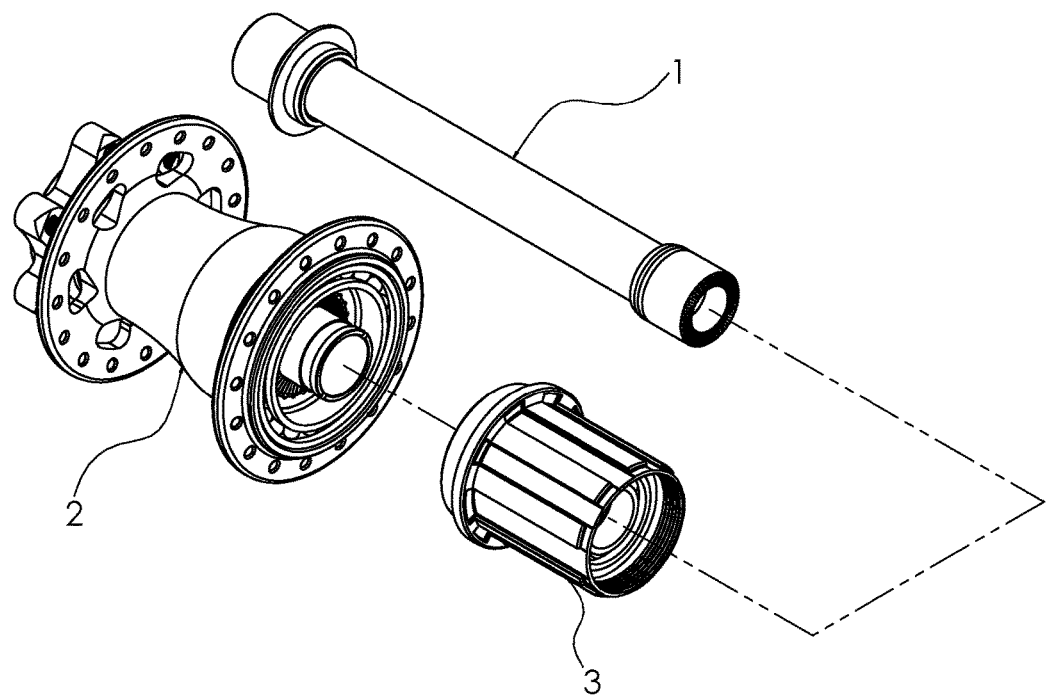
FIG. 2 shows the separated component groups of an embodiment of the bicycle rear hub by their primary functions and relative rotation.

FIG. 2 shows the three component groups of an embodiment of the bicycle rear hub, separated by their main functions. The main axle 1 is directly attached to the bicycle frame, and stays stationary where it does not rotate relative to the ground and the bicycle frame. The axle 1 also serves as the common axis for all parts of the assembly, and its defined by the center line running through the length of the axle 1. The hubshell 2 contains all the components of the mechanism that are rotary fixed to the wheel attached to the hub. The hubshell 2 is rotatably attached to the main axle 1 by means of bearings so that it is allowed to spin freely on the common axis from the main axle 1. The freehub shell 3 is where the drive-train of the bicycle attaches to the hub, having a singular or a plurality of cogs or sprockets attached on the exterior surface of the freehub shell 3. The freehub shell 3 contains all the components of the mechanism that are rotary fixed to the drive-train attached to the hub. The freehub shell 3 is rotatably attached to the main axle 1 by means of bearings so that it is allowed to spin freely on the common axis from the main axle 1. The only component that does rotate relative to all three component groups mentioned, is one or a series of coil members, which will be introduced and further explained below.

Figure 3A:
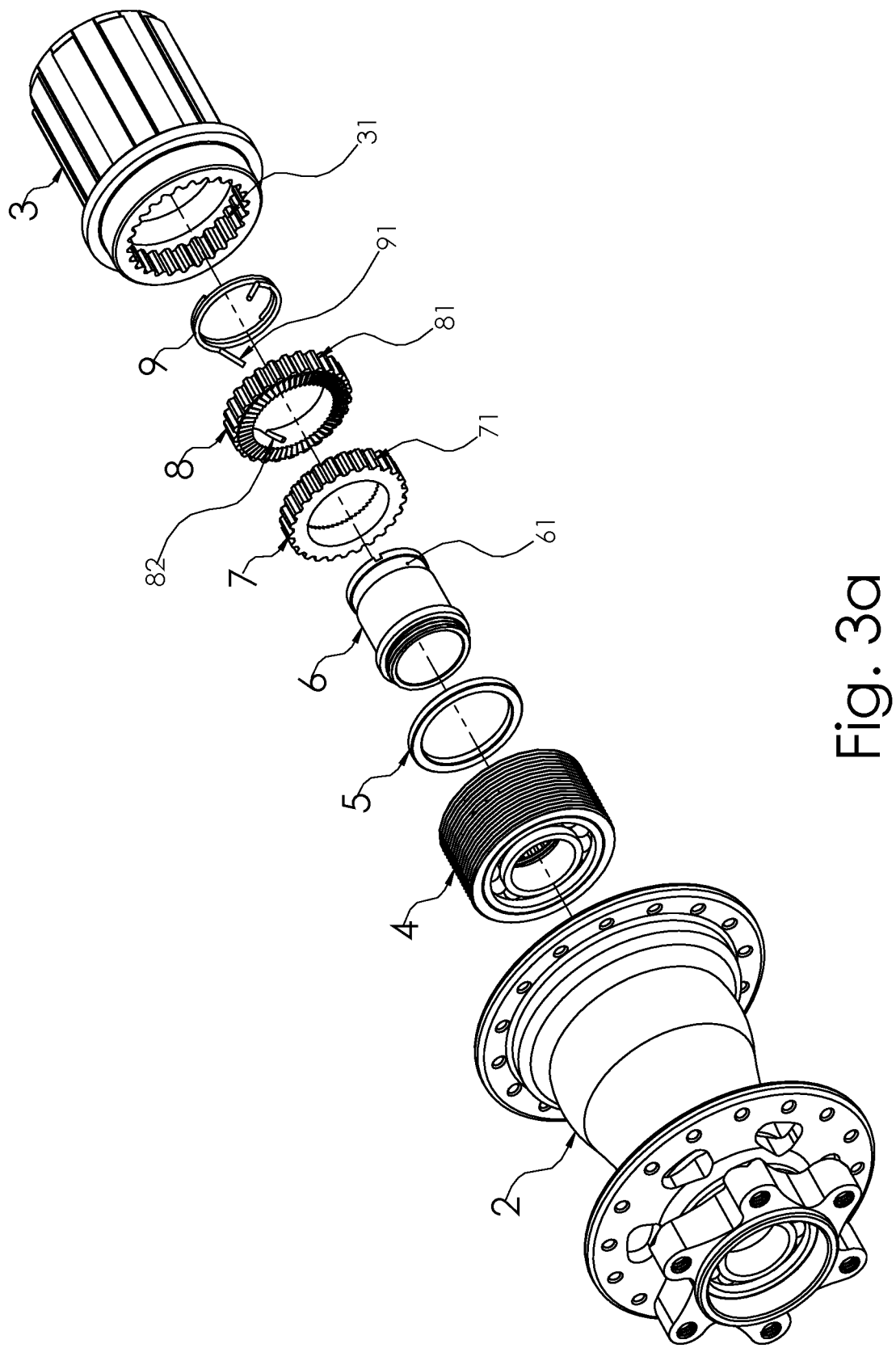
FIG. 3a shows an exploded view of the components of the preferred embodiment of the invention.
Figure 3B:
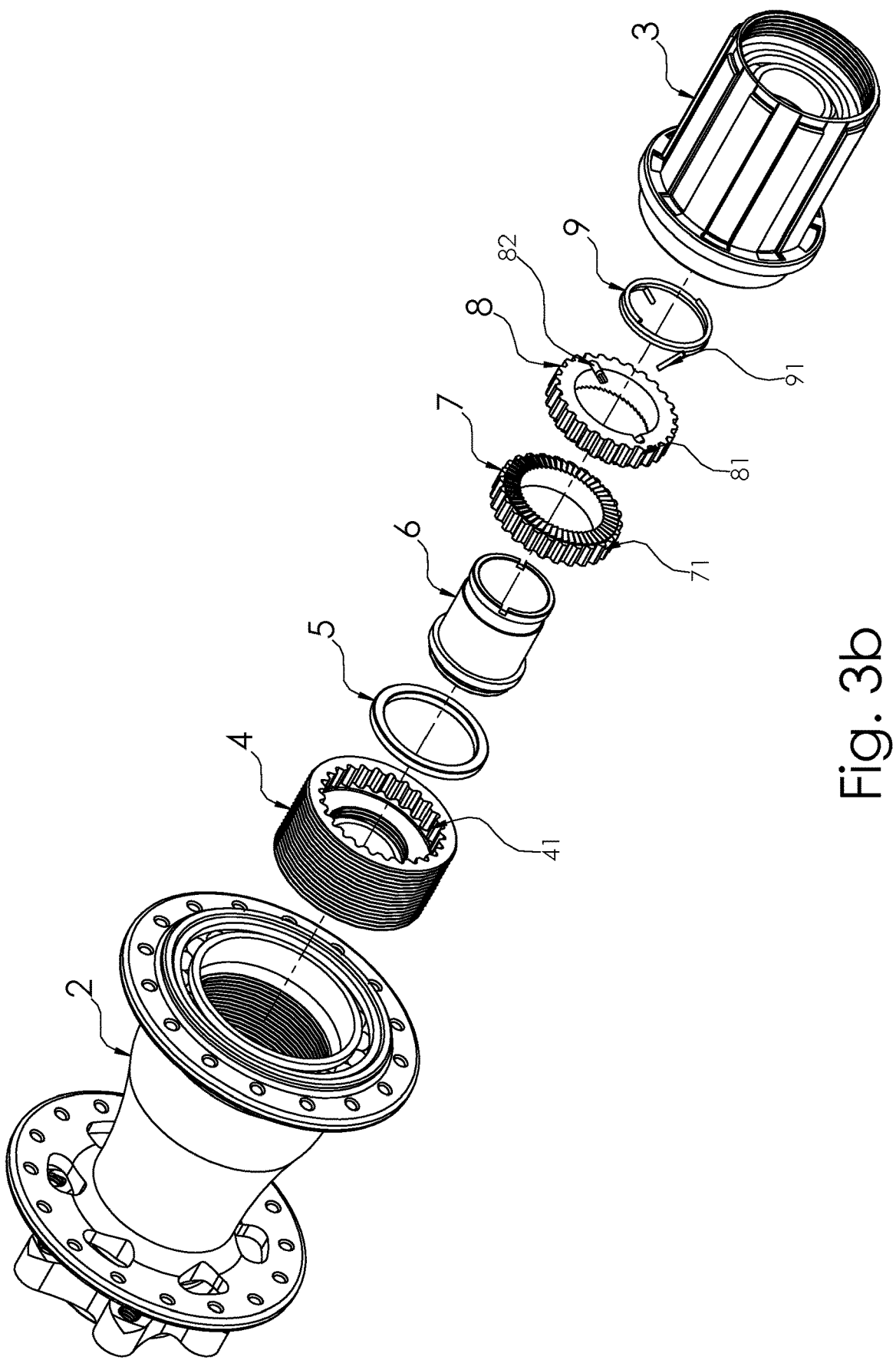

FIGS. 3a and 3b show the preferred embodiment of the invention in an exploded view, where a crown 4 attaches to the hubshell 2, by means of a screw thread, and its rotary and axially fixed to it. The crown 4 receives a cylinder member 6, by means of a screw thread, and is rotary and axially fixed to it. Crown 4 also receives a first face gear 7 by sliding into the Crown 4, where the first face gear 7 is rotary fixed to the crown 4, by a series of splines 71 disposed rotationally on the first face gear 7 along its axial length, and the crown 4 having a matching profile cavity 41 that interferes with the first face gear 7 from rotating relative to the crown 4 along the common axis. Between the crown 4 and first face gear 7, is a magnet 5 which retains the first face gear 7 from any axial displacement relative to crown 4 by magnetizing them together. The first face gear 7 can also be axially fixed to crown 4 by means of a press fit interference. The first face gear 7 goes over the cylinder member 6. A second face gear 8 also goes over the cylinder member 6, where the cylinder member 6 does not axially and rotarily interfere with the second face gear 8. A single or a number of coiling members 9 which are wound in series with each other, attach to the cylinder member 6 by coiling on a well 61 of the cylinder member 6 that prevents them from axially moving relative to cylinder member 6. These coiling members 9 attach to the second face gear 8 by protruding extensions 91 at one of their ends, which intrude into the second face gear 8 corresponding cavities 82 to form prismatic sliding joints with a running fit. A freehub shell 3 slides over the second face gear 8, where the second face gear 8 becomes rotary fixed to the freehub shell 3, by a series of splines 81 disposed rotationally on the second face gear 8 along its axial length, and the freehub shell 3 having a matching profile cavity 31 that interferes with the second face gear 8 from rotating relative to the freehub shell 3 along the common axis. The second face gear 8 is allowed to axially slide within the freehub shell 3. The freehub shell 3 slides into the hubshell 2 until it stops from the interference of its raised shoulder profile, and is rotatably attached to the hubshell 2 by means of bearings so that it is allowed to spin freely on the common axis from the hubshell 2.

The function of magnet 5, aside from allowing the ease of removal of the first face gear 7 from the crown 4 to service, is also to allow better alignment during coupling of the face gears teeth due to the magnetized first face gear 7 attracting second face gear 8 during a proximity before coupling and interlocking; also preventing undesired movement between the face gears at the coupled position from any on going vibrations induced externally.

Figure 4A:
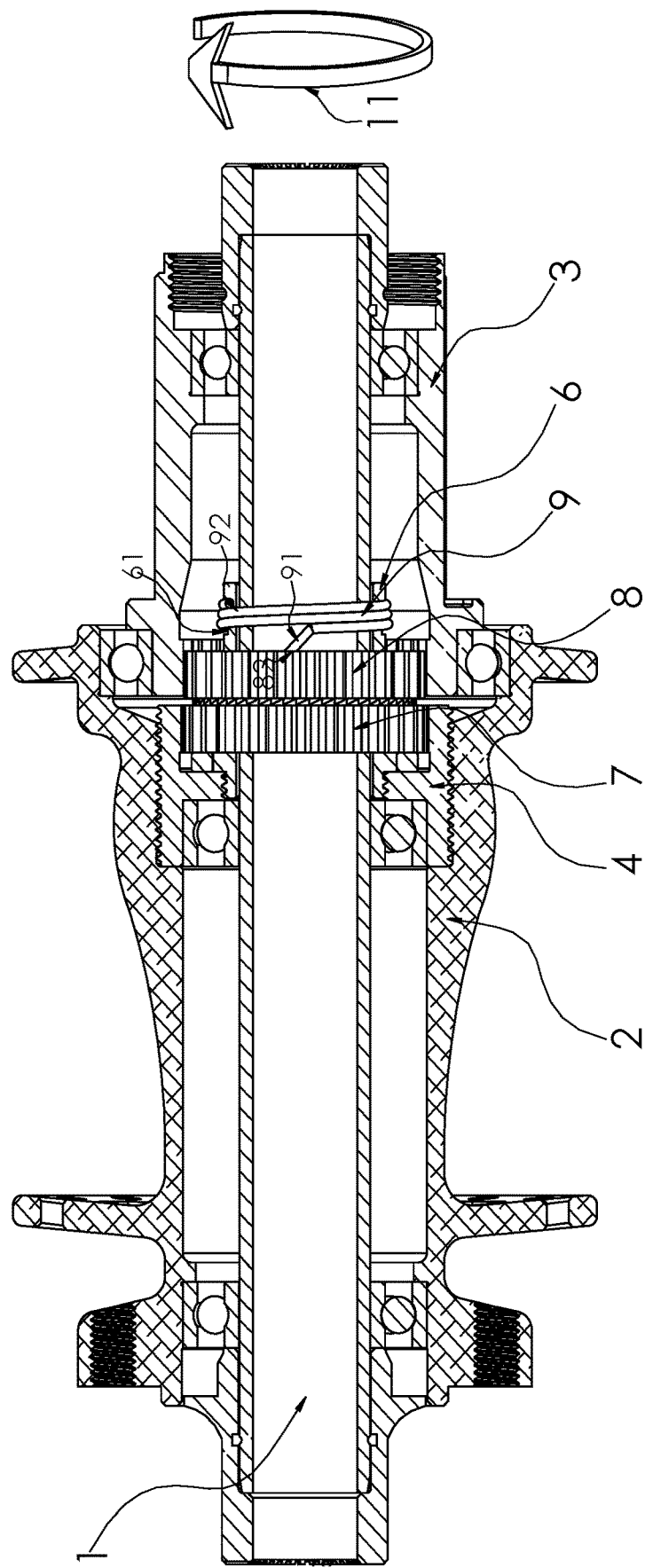
FIG. 4a shows a partially cut-away view of embodiment of the bicycle rear hub detailing the preferred embodiment of the invention within it, which illustrates the mechanism coupled on the driving torque transferring position
Figure 4B:
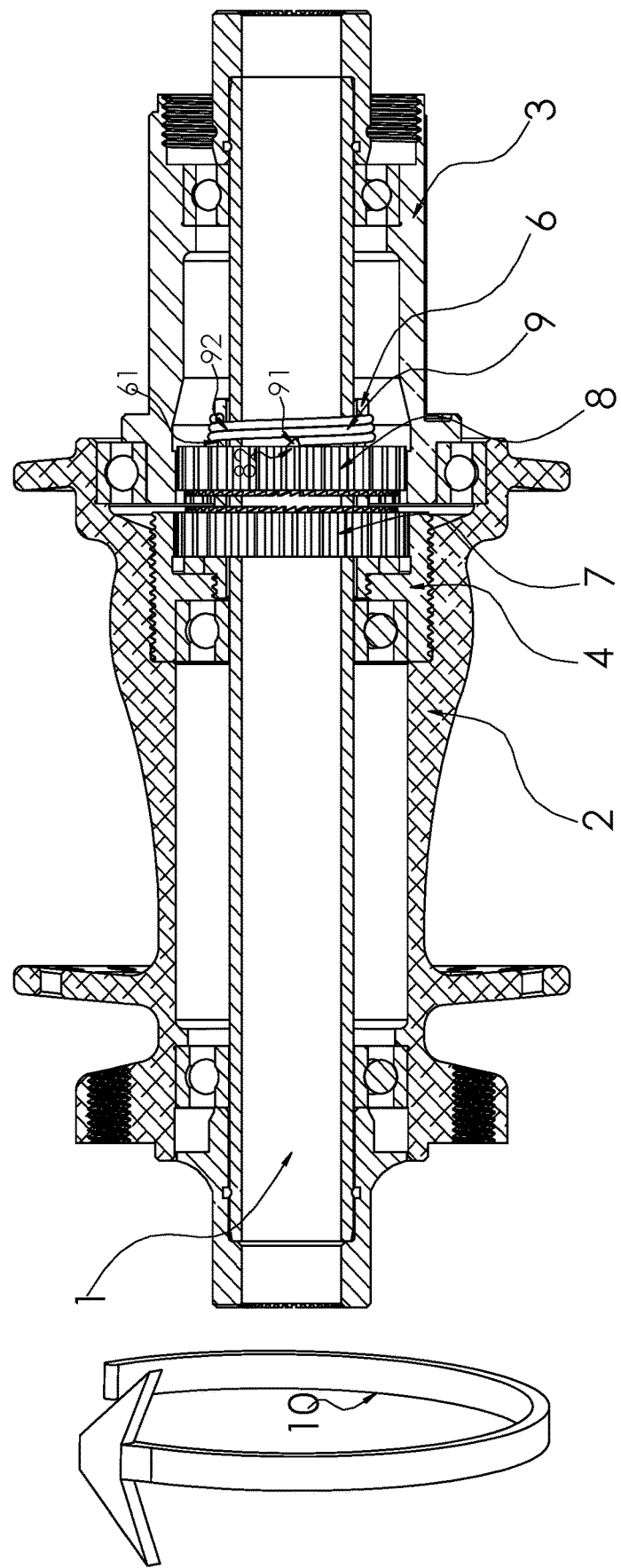
FIG. 4b shows the partially cut-away view found in FIG. 4a with the embodiment of the invention on the decoupled freewheeling position.

FIGS. 4a and 4b show the assembled embodiment of the invention with a partial cut-away. Where it further illustrates the assembled components rotary and axially fixed to the hubshell 2 being the crown 4, the cylinder member 6, the first face gear 7; and the component rotary fixed to the freehub shell 3 is the second face gear 8. It is also seen that some components are inter located and housed between the hubshell 2 and the freehub shell 3, as both housings interlock, having the freehub shell 3 enter the hubshell 2. The attached components to hubshell 2 also extend further out of hubshell 2 and into the freehub shell 3. For description purposes, these components are defined to being housed either by the hubshell 2 or the freehub shell 3, depending on their primary functions relative to each housing and the order of assembly.

As shown in FIGS. 4a and 4b, a single or plurality of coil members 9 attach onto the cylinder member 6 by coiling 92 onto the well 61 of the cylinder member 6. The coil members 9 attach to the second face gear 8 through protruding extensions 91 which have a length, an axis being defined by the center line running through the length of the protruding extensions, and the axis is askew from the common axis. The second face gear 8 has receiving cavities 82 where the protruding extensions 91 enter with a running fit. Together they form a prismatic sliding joint, where a rotation of the second face gear 8 relative to the coil members 9 displace the second face gear 8 axially towards the coil members 9 and away from the first face gear 7 in one direction, and displace the second face gear 8 axially away from the coil members 9 and towards the first face gear 7 in the other direction. The coil members 9 can rotate relative to the hubshell 2 and its fixed components, as well as relative the freehub shell 3, and as well as relative to the main axle 1. Because the coil members 9 are coiled 92 and wrapped on the cylinder member 6 at the well 61, they have a stationary friction against rotation of the coil members 9 relative to the cylinder member 6 in the common axis; where the sliding of the second face gear 8 in the prismatic joint relative to the coil members 9 does not overcome this stationary friction, except in the direction of rotation of the second face gear 8 relative to the coil members 9 that induces the axial displacement of the second face gear 8 towards the coil members 9, and where an interference between the second face gear 8 and the coil members 9 occur at the end of the travel of the prismatic joint, determined by the contact of the second face gear 8 to the coiling 92 of the coiled members 9. This motion of continuous rotation from the second face gear 8 is transferred to the coiled members 9 by the protruding extensions 91 that introduce an unwinding force on the coiling 92 to the cylinder member 6, and the coil members 9 begin to rotate relative to the cylinder member 6.

The mechanism motion can be explained by first looking at FIG. 4b where the mechanism is on its freewheeling and decoupled position; where the hubshell 2 with all its rotary fixed components are free to rotate in the indicated direction 10 on its common axis relative to the freehub shell 3, which houses the second face gear 8. The coil members 9 attached to the second face gear 8 by the protruding extensions 91 are going through an unwinding force that overcomes the static friction against rotation relative to the cylinder member 6, and stay rotary fixed with the second face gear 8 while the cylinder member 6 rotates relative to the coiled members 9 on the indicated direction 10 at the common axis. The unwinding torque experienced by the coil members 9 is founded upon the bottoming of the prismatic joint between the second face gear 8 and the coil members 9, that starts the transfer of torque. It's this same mechanics of torque conversion between both members to axial attraction through the prismatic joint during freewheeling, that maintains the second face gear 8 axially away from the first face gear 7, and prevents any contact between each other in this mode.

When looking at FIG. 4a, the mechanism is on the coupled and driving torque transferring position. This position is a result started by the rotation of the freehub shell 3 relative to the hubshell 2 in the indicated direction 11 coming from the freewheeling and decoupled position illustrated in FIG. 4b. During this rotation of the freehub shell 3 relative to the hubshell 2, the second face gear 8 which is rotary fixed to the freehub shell 3, rotates in the indicated direction 11 and slides on its prismatic joint axially towards the first face gear 7. The sliding of the second face gear 8 on the protruding extensions 91 of the coil members 9 does not overcome the static friction of the coil member 9 relative to the cylinder member 6. Due to the coiling 92 direction of the coiled member 9, any torque applied to the coil member 9 by the second face gear 8 as it slides on the prismatic joint, would wrap the coiling 92 of the coil members 9 tighter on the cylinder member 6, increasing the torque friction against rotation of the coil members 9 relative to the cylinder member 6. The second face gear 8 slides towards the first face gear 7 until they couple with an interference fit by the teeth disposed radially about the faces of both gears that meet. This interference couples the freehub shell 3 that carries the drive-train to the hubshell 2 that carries the wheel, so that the indicated direction 11 of rotational motion is transferred to the wheel by the drive-train.

Figure 5:
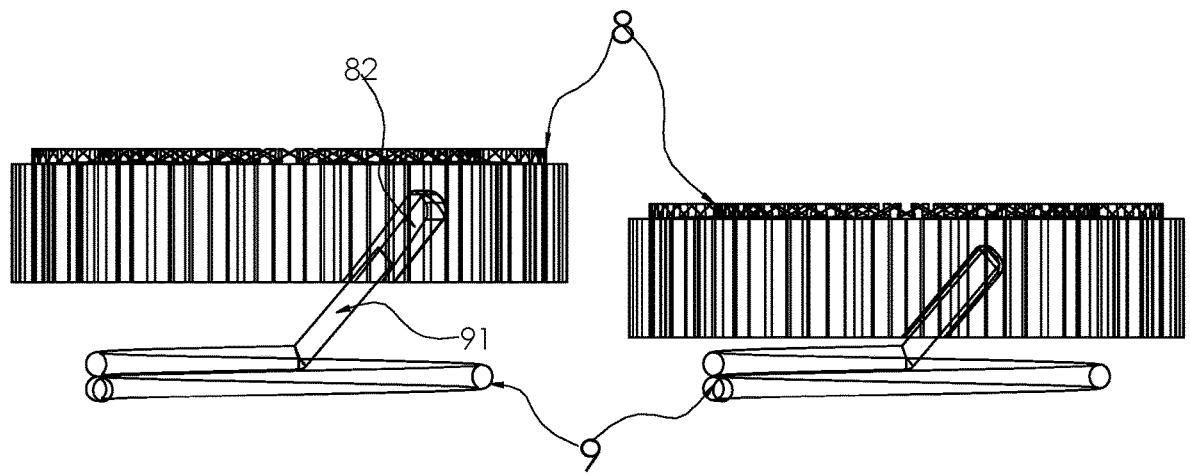
FIG. 5 shows a transparency detailing the prismatic joint of the preferred embodiment.

FIG. 5 shows a transparency of the second face gear 8 with a coil member 9 in two positions, which illustrates in higher detail the preferred embodiment of the prismatic sliding joint. The cavity 82 formed in the face of the second face gear 8 has a running fit for the protruding extensions 91 of the coil member 9, with an axis defined by the length of the cavity 82, where the axis is in-line with the axis of the protruding extensions 91 of the coil member 9. In the left illustration, the prismatic sliding joint is at the end of the travel, at the bottoming position during freewheeling. The right illustration shows the extended position of the prismatic sliding joint, where the second face gear 8 eventually couples with its counterpart face gear before the protruding extensions 91 leave the cavity 82.

Figure 6:
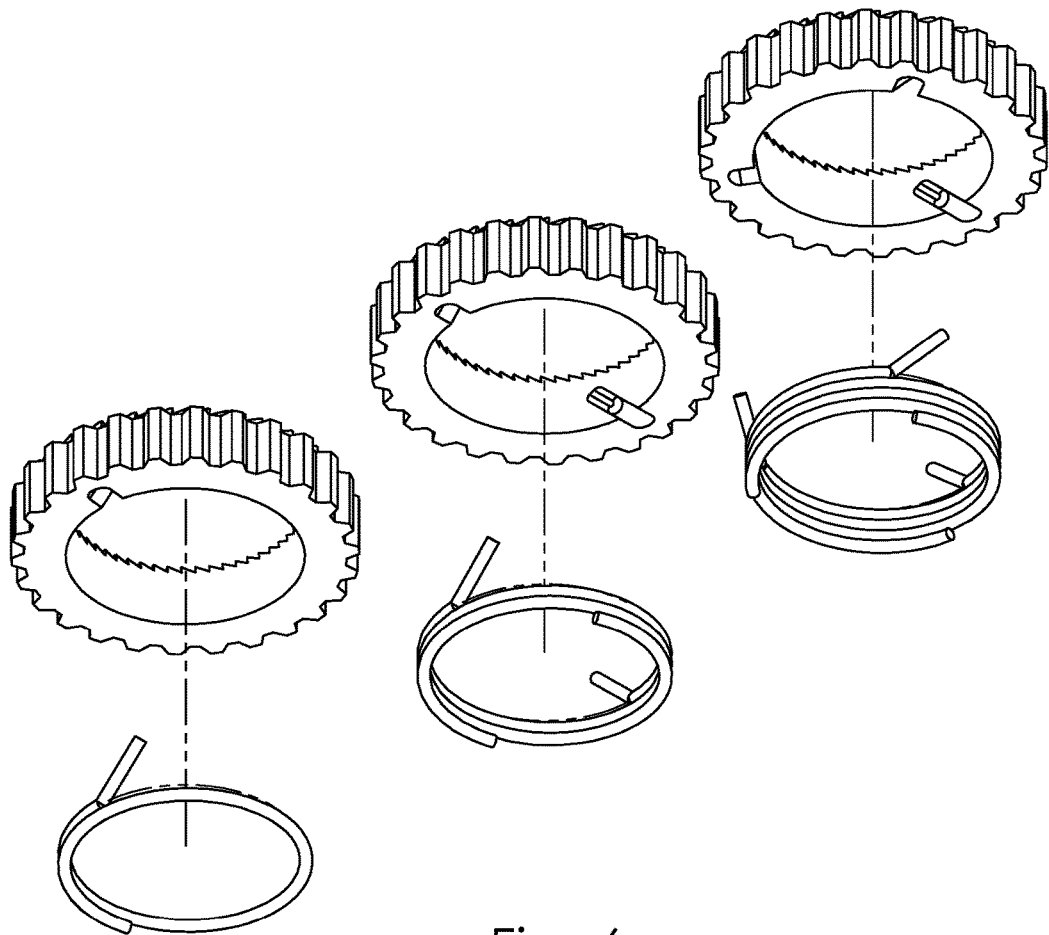
FIG. 6 shows alternate arrangements of the spring configuration in this embodiment of the invention.

FIG. 6 illustrates various configurations of the embodiment of the prismatic sliding joint, where more than one coiled member and its corresponding protruding extensions and cavities are applicable. The coiled members can be coiled in series to allow the protruding extensions reach the cavities in an axially level fashion. The use of more coiled members disposed equally apart radially supplements the desired prismatic sliding action.

The decoupling of the face gears in this proposed invention has the benefit of preventing direct wear from freewheeling on the main elements that carry the drive torque during the transmission of drive. By assigning separate components, or different faces of the same components as to prevent the drive torque carrying parts and faces from friction during freewheeling, each component can carry less duties and increase in their efficiency at their objective.

The invention shown in this embodiment described is not limited by the embodiment, and it should be apparent to those skilled in the art, that there invention is susceptible to changes and modifications without departing from the spirit of the invention, which are defined in the following claims.

I claim:

1. A drive engagement assembly for a bicycle that can decouple without ratcheting,
   comprising:
   a first face gear;
   a housing for the first face gear, wherein the first face gear is fixed in rotation and axial displacement with the housing, and the housing is laced or attached to a wheel;
   a cylindrical member disposed adjacent to the housing of the first face gear, wherein the cylindrical member has a length, an axis being defined by a center line running through its length, the cylindrical member extending through the first face gear;
   at least one coiled member coiled to the cylindrical member, wherein the at least one coiled member applies friction against rotation over the cylindrical member, such that the friction is increased in a wrapping direction and is decreased in an unwinding direction, and the at least one coiled member has a protruding extension at one of its ends, with the protruding extension having a length, an axis being defined by a center line running through the length of the protruding extension, and the axis being askew from the axis of the cylindrical member;
   a second face gear, the second face gear being rotatable and axially displaceable relative to the cylindrical member, the cylindrical member extending through the second face gear, the second face gear having at least one cavity on a face opposing a face with gear teeth, the at least one cavity having a length, an axis defined by a center line running through the length of the at least one cavity, the at least one cavity being attached to the at least one coiled member by having the protruding extension penetrate the at least one cavity, with the axis of the at least one cavity being co-axial with the axis of the protruding extension, so that the second face gear can axially slide from the at least one coiled member by a prismatic sliding effect of the at least one cavity at the protruding extension, due to a resultant common axis between the at least one cavity and the protruding extension being askew from the axis of the cylindrical member; and a housing for the second face gear, wherein the second face gear and the housing for the second face gear are rotationally fixed, but the second face gear is axially displaceable within the housing for the second face gear.

2. A method for decoupling driving elements from a bicycle wheel, comprising:

providing a first shell rotatably attached to an axle, a cylinder member attached to the first shell, the cylinder member having a length, an axis being defined by a center line running through the length of the cylinder member, the first shell houses a first face gear, the first shell attached to a wheel;

providing a second shell rotatably attached to the axle, the second shell having driving elements attached to its external surface, the second shell housing a second face gear;

providing a plurality of coil members coiled to the cylinder member and attached to the second face gear by a protruding extension at one end of the plurality of coil members, the protruding extension having a length, an axis being defined by a center line running through the length of the protruding extension, the axis of the protruding extension being askew from the axis of the cylinder member, and the protruding extension penetrates at least one cavity on a face opposing a face with gear teeth of the second face gear, the at least one cavity having a length, an axis defined by a center line running through the length of the at least one cavity, with the axis of the at least one cavity being co-axial with the axis of the protruding extension, so that the second face gear can axially slide from the plurality of coiled members by a prismatic sliding effect of the at least one cavity at the protruding extension, due to a resultant common axis between the at least one cavity and the protruding extension being askew from the axis of the cylinder member;

slowing a rotation speed of the second shell relative to the first shell during which the cylinder member and the plurality of coil members start to rotate relative to the second face gear;

applying a rotational interference to the second face gear by the prismatic sliding effect of the at least one cavity of the second face gear at the protruding extension at one end of the plurality of coil members, as the cylinder member and the plurality of coil members rotate relative to the second face gear, so as to guide the second face gear to follow a path which induces an axial displacement away from the first face gear, the axial displacement co-axial with the axis of the cylinder member;

decoupling the second face gear from the first face gear through the axial displacement of the second face gear; and decoupling the second shell from the first shell by the decoupling of the second face gear from the first face gear, allowing the driving elements to rotatably disconnect from the wheel.

\* \* \* \* \*